June 24, 1958      J. GREENHUT      2,840,666

THERMAL MOTOR PROTECTION SWITCH

Filed April 13, 1954

INVENTOR.
JOSEPH GREENHUT

BY

ATTORNEYS

United States Patent Office 2,840,666
Patented June 24, 1958

2,840,666

THERMAL MOTOR PROTECTION SWITCH

Joseph Greenhut, University Heights, Ohio

Application April 13, 1954, Serial No. 422,938

8 Claims. (Cl. 200—122)

The present invention relates to thermo-responsive cut-out switches for the protection of electrical motors against overheating. Such overheating can result from various causes, such as overloading, mechanical failure or extreme line voltage changes. Irrespective of the cause of overheating of a motor during its operation, such overheating denotes an unsatisfactory operating condition which will ultimately result in burn-out and failure of the motor.

The prior art reveals many devices for effecting motor protection by means of thermo-responsive units. Perhaps the best known and most effective of such devices is the snap-action bimetal disc which is combined with an electrical heater element and mounted directly on the motor, preferably within the motor frame. The disc and heater are electrically connected with the motor windings so that the motor current passes through them. The disc is provided with contacts to normally maintain a closed circuit. However, when the current values in the winding exceed predetermined safe values, the heater causes the thermal disc to snap or reverse itself so as to open the contacts in the motor circuit.

In the described prior art switch, the thermal disc has predetermined fixed characteristics of thermal response limits which are related to the body temperature of the disc. The heater element must have a predetermined fixed electrical characteristic which matches or correlates with the electrical characteristics of the motor winding circuit, and it must be physically located in a precise position relatively to the disc so as to expose the disc to proper values of heat radiation and heat transfer which may be determined empirically for any particular motor protection application.

It will be recognized that each manufacturer of electrical motors builds a variety of models, each of which has electrical characteristics which differ significantly from those of the other models. Even in so-called identical designs coming off a production line, there may be slight variations in electrical characteristics.

Once the motor protection switch design and characteristics have been matched to a particular model of motor, the switch can be duplicated with reasonable precision to be applied to all identical motors and will give consistent cut-out results at selected conditions of current value and disc temperature.

It will be apparent from the foregoing, that a particular design of switch is useful only on a motor having electrical characteristics which are matched by the switch. This fact has forced each motor manufacturer to stock a large variety of motor protection switches corresponding to the various designs, models, sizes and modifications which he manufactures. He also often finds himself with a sizeable overstock or surplus of certain types of switches and a shortage of other types of switches.

It is the primary object of my invention to overcome the inventorying and cost disadvantages which arise from the above-described use of single-use motor protection switches.

Another object of my invention is to provide a motor protection switch easily adaptable to a broad range and variety of electrical motor circuits.

Still another object of my invention is to provide a multiple-use switch of the character described which will compare favorably in its uniformity, quality, and sensitivity of operation with the prior art single-use switches.

A further object of my invention is to provide inexpensive means for modifying or adapting single-use prior art switches for use on motors which have electrical characteristics which do not match the switch operating characteristics.

Other objects and advantages of my invention will be apparent during the course of the following description.

In the accompanying drawings forming a part of this specification, and in which like numerals are employed to designate like parts throughout the same.

Figure 1:
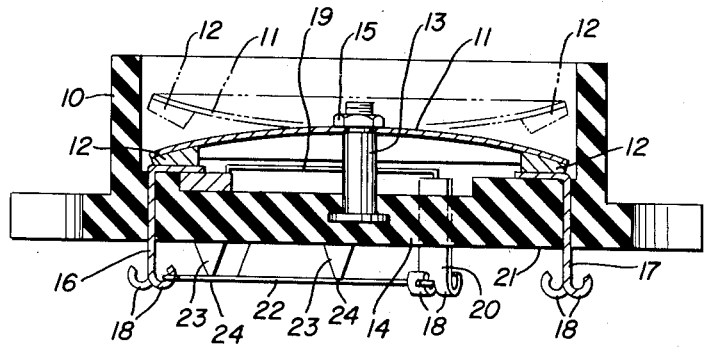
Fig. 1 is a longitudinal cross-section of a motor protection switch embodying the features of my invention.
Figure 2:
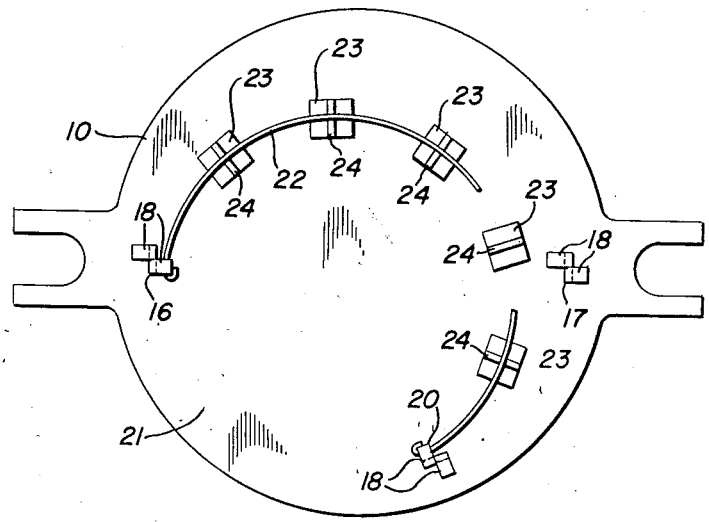
Fig. 2 is a plan view of the switch shown in Fig. 1.

Referring more particularly to Figs. 1–2 of the drawings, the reference character 10 designates a housing or casing for the switch, which may be formed of any suitable material and is generally molded of a non-conductive synthetic resin.

Mounted within the housing 10 is a thermal disc 11 having a pair of contacts 12 integrated therewith. The disc is secured, centrally thereof, to a post 13 which projects vertically from the bottom wall 14 of the housing 10. A nut 15 may be utilized to secure the disc 11 to the post 13.

The post 13 supports the disc 11 in normal contact-making relationship with spaced terminal contact strips 16 and 17 which are molded into the housing 10 and which underlie the spaced contacts 12. The terminals 16 and 17 project exteriorly of the housing and are each provided with dual connector clips 18 for a purpose to be described.

A heater element 19 is mounted within the housing 10 in fixed relationship to the disc 11, so that the disc 11 is exposed to the heat or thermal emissions of the heater. One end of the heater element 19 is firmly connected to the contact strip 16, and the other end of the element 19 is secured to a terminal 20 which is similar to the terminals 16 and 17, and likewise is provided with connector clips 18.

The exterior surface 21 of the bottom wall 14 of the housing 10 is provided with suitable means for supporting a resistance element 22 which is connected across terminals 16 and 20 by means of the clips 18. The supporting means may be in the form of a series of raised projections or bosses 23 of triangular cross-section each of which provides an edge 24 on which the resistance element 22 may lie. The bosses 23 define an arcuate path of sufficient length to accommodate the length of the element 22. The ends of the element 22 may be secured in the respective clips 18 merely by crimping them around the element, or the like.

Figure 3:
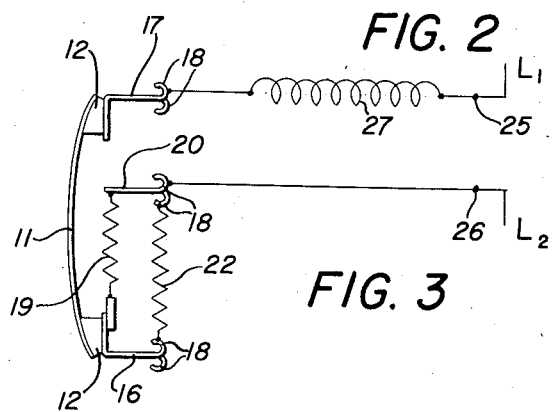
Fig. 3 is a schematic wiring diagram of the switch unit.

In Fig. 3, I have indicated diagrammatically the manner in which the switch is connected into the motor power circuit. The reference characters 25 and 26 represent the motor terminals of a single-voltage single-phase A. C. motor, and the winding of the motor is indicated by the numeral 27. It will be seen that the switch is connected in series with the motor winding 27, with one end of winding 27 connected to terminal 17 of the switch and the other end of the winding connected to motor terminal 25. The terminal 20 of the switch is connected to terminal 26 of the motor. The dual clips 18 on the terminals permit the resistance 22 to be connected or removed without disturbing the motor circuit connections.

When the thermal disc 11 is in its normal or closed-circuit position, the current will flow through the body of disc 11 and through the elements 19 and 22 which are connected in parallel. It will be understood that the heater element 19, due to its physical proximity to disc 11, will expose the disc to the heat energy emitted by the element 19. When such thermal emission rate is unduly high in correlation with the ambient or operating temperature of the motor, the disc 11 will become heated to its opening temperature and will snap into reverse curvature to separate the contacts and open the motor circuit. When the disc 11 cools to a predetermined temperature, it will snap back to its original position to again close the circuit.

In order to make clear the function of the external resistance element 22, reference is again made to the prior art switches which do not embody such a resistance. It may be assumed, for purposes of illustration, that in the switch herein described, the heater element 19 has a resistance of 0.12 ohm and that the thermal disc 11 is constructed to reverse its curvature at 120° C. and to snap back to its original position at 93° C. The physical location of the heater element relatively to the disc and the various design factors involved may be assumed to result in a switch A which, in the absence of the resistance 22, would have the following characteristics on a 110 v. A. C. motor circuit:

(a) Minimum continuous current value which will cause ultimate trip of the switch when the disc is at the stated temperature:

6.6 amps at 25° C.
    5.0 amps at 65° C.
    3.6 amps at 90° C.

(b) Current value necessary to cause tripping of the switch at 25° C. ambient temperature in the time stated:

16.5 amps in 15 seconds
    14.4 amps in 20 seconds
    12.2 amps in 30 seconds
    9.7 amps in 60 seconds
    8.1 amps in 120 seconds Such a switch A would then match the electrical characteristics of a particular design, model and size of motor in the sense that the heater element 19 would reflect the temperature of the motor winding and the disc 11 would be heated in response to the reflected or matching temperature. The above-mentioned characteristics of the switch would protect the motor to which it is matched, while at the same time it would avoid nuisance trip-outs or cut-outs caused by over-sensitive response to momentary conditions of overload or starting load.

Now, I will assume the necessity for providing a protector switch for another model of motor. To match the characteristics of this motor the prior art provides a different switch B in which the resistance of the heater element is 0.052 ohm, instead of 0.12 ohm. The switch B would have the following tripping characteristics:

(a) Minimum continuous current value which will cause ultimate trip of the switch when the disc is at the stated temperature:

9.4 amps at 25° C.
    7.2 amps at 65° C.
    5.3 amps at 90° C.

(b) Current value necessary to cause tripping of the switch at 25° C. ambient temperature in the time stated:

22.5 amps in 15 seconds
    20.0 amps in 20 seconds
    17.0 amps in 30 seconds
    13.8 amps in 60 seconds
    11.4 amps in 120 seconds It will be noted that for each of the stated current values listed for switch A, the corresponding current value for switch B is uniformly about 1.4 times greater. In other words, for each characteristic condition listed above, the current value of switch B will have the ratio of 1.4:1 in relation to the counterpart current value of switch A.

In studying the characteristics of various single-use prior art switches, I have determined that if two switches are identical, except for the resistance value of the heater element, that both switches will have a substantially similar response pattern to time and temperature tripping factors, as exemplified by the example given above.

Due to the precision and permanence with which such single-use switches are built, it has been found to be uneconomical and impracticable to attempt to physically replace a heater element of one resistance value by a heater element of another resistance value in order to modify or convert a switch from one motor protection application to another. However, by use of the resistance element 22, such a modification may be made electrically, rather than physically.

Thus, if the prior art switch A, discussed above, is to be modified for use in lieu of switch B, a selected value of external resistance element 22 may be connected in parallel with the heater element of switch A to substantially reproduce the response pattern of switch A at the higher current values of switch B. This modified switch A would then correspond to the embodiment of my invention herein described.

In approximate terms, if modified switch A is to have an ultimate trip at 9.4 amps minimum at 25° C. (corresponding to switch B), then a value of external resistance 22 must be selected which will divert 2.8 amps from the heater element 19 so that it will carry only 6.6 amps (the ultimate trip of switch A at 25° C.) when the motor circuit is carrying 9.4 amps. It will be apparent that if heater element 19 has a resistance of 0.12 ohm, then external resistance 22 should have a resistance of 0.28 ohm to carry 2.8 amps, leaving heater element 19 carrying the desired 6.6 amps.

When the current in the motor circuit is approximately 7.2 amps (the ultimate trip at 65° C. for switch B), the heater element 19 will carry 5.0 amps (the ultimate trip at 65° C. for switch A) and the resistance element 22 will carry 2.2 amps.

The modified switch A will respond similarly to the other characteristic current values of switch B which have been listed above. By using the bottom wall 14 of the housing to insulate and shield the thermal disc 11 from the thermal energy emissions of the resistance 22, the response pattern of the modified switch remains consistent.

Accordingly, by following the teachings herein disclosed, any single-use switch of the character described can be modified to respond to a higher motor circuit current value in the same protection response pattern which has been established for the lower current values. This modification method permits surplus inventory stocks of single-use switches to be adapted to current manufacturing needs in a practical and extremely economical manner.

It will also be apparent that my invention contemplates that the present costly practice of stocking and utilizing a single-use switch for each variety of motor protection service can be eliminated. A single design or model of switch, constructed in accordance with my invention, is adapted to cover a broad range of motor protection applications, in which the switch is matched to the motor characteristics by selection of a proper value of external resistance, which can readily be determined by calculation and test by a person skilled in the art. Instead of purchasing and stocking a great variety of single-use switches, a motor manufacturer can stock a variety of resistance elements 22 and only one design of switch. Inasmuch as such resistance elements generally cost less than 5% of the cost of a prior art single-use switch, tremendous savings in inventory and obsolescence costs can be achieved.

Although I have referred throughout this description to the use of the switch on a single voltage motor, it will be understood that the switch is adapted for use on dual voltage motors in a manner well known to those skilled in the art. Whether the switch is of the automatic-reset type or of the manual-reset type does not bear upon the invention.

The use of the described switch would also result in greater safety protection for the purchasing public. Many motors that should be provided with a protective switch, are supplied without such devices for reasons of economy. Because of the high cost of testing and purchasing small quantities of custom built motor protectors, manufacturers who produce motors in relatively small lots, and their csutomers, find it economically impracticable to equip them with protective switches. The use of a standardized switch and calibrated external resistor, as described, would readily lend itself to small lot production and would permit economical protection of motors which are now entirely unprotected or inadequately protected.

The switch herein disclosed represents a preferred embodiment of the invention. The principles involved can, however, also be utilized in combination with line starters. The external resistance may be mounted in the starter instead of on the switch and the thermal unit may be mounted in the motor, as herein described. Such a combination would be responsive not only to excessive current values, as is the case in the prior art combination of thermal elements disposed in line starters, but would also be responsive to the actual operating temperature conditions in the motor, and thus provide a greater scope of motor protection than the conventional thermally responsive line starter devices.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a circuit overload switch for electrical motors, the combination of a thermo-responsive switch-actuating member in said load circuit, a heater element connected in series in said circuit in energy-transmitting proximity to said member, a calibrating resistance element connected in parallel circuit with said heater element, and means interposed between said member and said resistance element to substantially isolate said member from the energy transmissions of said resistance element.

2. In a circuit overload switch for electrical motors, the combination of a thermo-responsive switch-actuating member in said load circuit, a heater element connected in series in said circuit in energy-transmitting proximity to said member, a calibrating resistance element connected in parallel circuit with said heater element, and insulating means interposed between said member and said resistance element to isolate said member from the energy transmissions of said resistance element, said electrically combined elements matching the electrical characteristics of said motor circuit.

3. In a circuit overload switch for electrical motors, the combination of a thermo-responsive switch-actuating member in said load circuit, a heater element connected in series in said circuit in energy-transmitting proximity to said member, an insulating housing substantially enclosing said member and element, and a calibrating resistance element mounted exteriorly of said housing in thermal isolation from said member and connected in parallel circuit with said heater element, said electrically combined elements matching the electrical characteristics of said motor circuit.

4. In a circuit overload switch for electrical motors, the combination of a housing, a thermo-responsive switch-actuating member mounted within said housing, a heater element connected in said circuit in energy-transmitting proximity to said member, a calibrating resistance element connected in parallel circuit with said heater element, means provided on the exterior of said housing for supporting said resistance element in spaced relationship to said housing, and a thermal insulating barrier disposed between said resistance element and said member.

5. In a circuit overload switch, the combination of a circuit-breaking switch, a thermo-responsive switch-actuating member in series in said circuit, a first resistor element in series with said member in heat-transmitting proximity thereto, said member having a predetermined switch-opening pattern in response to a characteristic current value in said resistor element, and means for maintaining said switch-opening response pattern at a circuit current value in excess of said characteristic value, said means comprising a second resistor element, means for replaceably connecting said second resistor element in parallel with said first resistor element, and insulating means for thermally isolating said second resistor element from said member, said second resistor having a fixed resistance of a value sufficient to maintain said characteristic current value in said first resistor element.

6. In a circuit overload switch, the combination of a housing, a thermo-responsive switch-actuating member mounted by said housing, a heater element connected in said circuit in heat-transmitting proximity to said member, a resistance element connected in parallel circuit with said heater element, and means provided on said housing for supporting said resistance element in thermally-isolated relationship to said member.

7. In a circuit overload switch, the combination of a housing, a thermo-responsive switch actuating member mounted by said housing, a heater element mounted in heat-transmitting proximity to said member, a resistance element, means for detachably connecting said resistance element in parallel circuit with said heater element, means provided on said housing for maintaining said resistance element in spaced relationship thereto, and a thermal insulating barrier provided on said housing between said member and said resistance element.

8. A circuit overload switch for electrical motors having a thermal disc and a heater element disposed in energy-transmitting relationship to said disc; characterized by a calibrating resistance element, means for detachably connecting said resistance in electrical parallel with said load circuit, and a thermal insulating barrier interposed between said resistance element and said disc to isolate said disc from the energy-transmissions of said resistance element.

References Cited in the file of this patent

UNITED STATES PATENTS

| Number | Name | Date |
| --- | --- | --- |
| 1,597,719 | Burnham | Aug. 31, 1926 |
| 1,664,201 | Fay | Mar. 27, 1928 |
| 1,763,137 | Dorfman | June 10, 1930 |
| 1,980,756 | Hoover | Nov. 13, 1934 |
| 2,094,386 | Veinott | Sept. 28, 1937 |
| 2,199,388 | Bolesky | May 7, 1940 |
| 2,279,214 | Veinott | Apr. 7, 1942 |
| 2,333,536 | Lee | Nov. 2, 1943 |
| 2,343,132 | Barr | Feb. 29, 1944 |
| 2,414,531 | Johns | Jan. 21, 1947 |
| 2,439,069 | Anderson | Apr. 6, 1948 |
| 2,471,924 | Bolesky | May 31, 1949 |
| 2,497,684 | Ogden | Feb. 14, 1950 |
| 2,508,350 | Belgeri | May 23, 1950 |
| 2,535,969 | Tramontini | Dec. 26, 1950 |
| 2,611,855 | Turner | Sept. 23, 1952 |
| 2,687,468 | Munschak | Aug. 24, 1954 |

FOREIGN PATENTS

| Number | Country | Date |
| --- | --- | --- |
| 692,017 | Great Britain | May 27, 1953 |